Patented Nov. 20, 1951

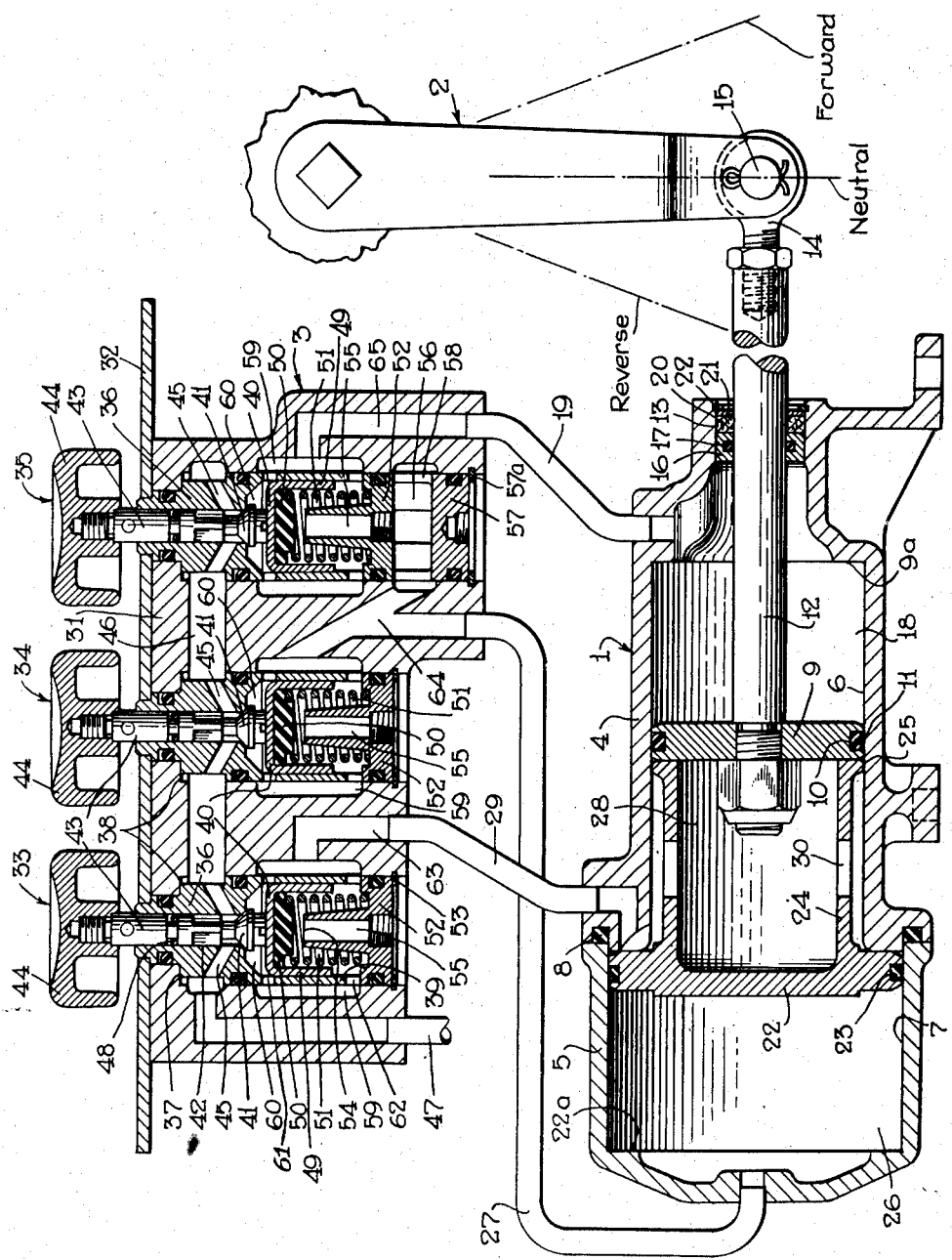

2,575,982

UNITED STATES PATENT OFFICE 2,575,982

FLUID PRESSURE CONTROL MECHANISM

Roy R. Stevens, Forest Hills, Pa., assignor to Westinghouse Air Brake Company, a corporation of Pennsylvania Application April 14, 1949, Serial No. 87,441

1 Claim. (Cl. 277—60)

This invention relates to fluid pressure control apparatus of the type used for selectively controlling multiple position clutches, gear changers etc. where definite positioning is demanded.

One object of the invention is the provision of an improved control apparatus of the above type.

Another object of the invention is the provision of an apparatus of the above general type embodying an improved fluid pressure controlled positioning motor and an improved manually operated fluid pressure controlling means therefor.

In certain reversing clutches, as well as gear changers, the clutch engagement or gear changer is maintained in a selected position after being so placed by spring action through toggle mechanisms in over dead-center positions thereof, and also by quadrant and quadrant riders, etc. Power is therefore required only for moving the clutch or gear changer control substantially into a selected one of its different positions and is not required for maintaining the clutch or gear changer in the selected position. In many cases it is not desirable to maintain pressure on the clutch or gear changer controls in that it causes undue wear to the shifting bearings.

Another object of my invention is therefore the provision of an improved power operated positioning apparatus embodying a multiple position fluid pressure actuated power motor for selectively positioning a device such as a three position clutch or the like, and a valve means embodying a plurality of individual control valve units, corresponding in number to the number of positions of the power motor, each manually operative to supply fluid under pressure to said motor for effecting movement thereof to a corresponding selected position and operable automatically upon release of manual pressure to release fluid under pressure from said motor.

Other objects and advantages will be apparent from the following more detailed description of the invention.

In the accompanying drawing, the single figure is a diagrammatic view of a control apparatus embodying the invention.

As shown in the drawing, the reference numeral 1 indicates a power motor device for positioning a three position clutch control member 2, or the like, and the numeral 3 indicates a manually operative control valve device for controlling said power motor device 1.

The power motor device 1, comprises two oppositely arranged cup-like casing members 4 and 5, the casing member 4 having a bore 6 of one diameter and the casing member 5 having a bore 7 of a larger diameter, the two bores being open at adjacent ends of said members and closed at the opposite ends. The casing members 4 and 5 are secured together with the bores 6 and 7 in coaxial relationship and with a gasket 8 sealing the joint therebetween.

A piston 9 slidably mounted in the bore 6 of casing 4 is provided with an annular groove 10 in which is fitted a suitable sealing ring 11 having sliding and sealing engagement with the wall of said bore. The piston 9 is solidly secured to one end of a piston rod 12 which extends through a concentrically arranged opening 13 in the closed end wall of the bore 6. In the opposite or outer end of the piston rod 12 is a screw-threaded bore in which is adjustably disposed the threaded end of an eyebolt 14 which is adapted to be connected by a pin 15 to the device to be controlled such, as the clutch lever 2 which may have neutral, forward and reverse positions, as indicated by legends on the drawing.

Secured by a friction fit in the casing bore 13 is an annular member 16 having an annular groove in its inner face in which is located a sealing ring 17. This sealing ring 17 has a sliding and sealing engagement with the peripheral surface of the piston rod 12 to prevent leakage of fluid pressure from the bore 6 to the atmosphere. The piston 9, the wall of bore 6, the closed end of the casing 4 and the member 16 together with the seal 17 define a chamber 18 which is open at all times by a pipe 19 to the control valve device 3. Also included in the bore 13 of casing 4 is a felt ring 20, a metal washer 21 and a spring retaining ring 22 arranged in the order named with the felt ring in engagement with member 16. The felt ring has sliding contact with the piston rod 12 and is saturated with lubricant in order to lubricate the bearing of said rod in member 16 and the washer 21.

A piston 22 of suitable diameter is mounted in the bore 7 in casing 5. This piston is provided with an annular groove in which a sealing ring 23, having sliding and sealing engagement with the wall of bore 7, is located. The piston 22 is further provided with a cylindrical extension member 24 which extends into bore 6 of the casing member 4 and therein terminates in an annular shoulder 25 which has a sliding fit in bore 6. This extension 24 and shoulder 25 form a guide member for the piston 22 and also a stop member for piston 9 as will later be explained. The closed end of casing 5, the wall of bore 7 and the face of piston 22 define a fluid pressure receiving chamber 26 which is open at all times by a pipe 27 to the control valve device 3.

The adjacent faces of pistons 9 and 22 and the walls of bores 6 and 7 define a third chamber 28 between said pistons which is open at all times to the control valve device 3 by a pipe 29. Ports 30 in the extension 24 permit a continual equalization of pressures on all portions of piston 22 adjacent chamber 28.

The operation of the power motor 1 is as follows:

Upon supply of fluid pressure by pipe 19 to chamber 18, while pipes 27 and 29 and hence chambers 26 and 28 are open to the atmosphere, the piston 9 will be moved by such fluid in the direction of the left hand into engagement with the piston extension 24, and if the piston 22 is not already in engagement with a shoulder 22a in the casing 5 the piston 9 will move piston 22 into such engagement whereupon movement of piston 9 will be stopped by said extension for positioning the clutch control lever 2 in its reverse position.

The power motor will definitely position the clutch control lever 2 in the forward position defined by engagement of piston 9 with a shoulder 9a in the casing upon supply of fluid pressure by pipe 29 to chamber 28 while pipe 19 is open to the atmosphere, as will be apparent.

This power motor device will definitely position the clutch control lever 2 in the neutral position, in which it is shown in the drawing, upon supply of fluid pressure via pipes 19 and 27 to chambers 18 and 26, respectively, while pipe 29 and hence chamber 28 are open to the atmosphere. The pressure of fluid thus provided in chamber 18 and acting on piston 9 will urge said piston against the extension 24, while piston 22 being approximately twice the area of piston 9 the pressure of fluid in chamber 26 acting thereon will provide a force so exceeding the opposing force of piston 9 that even with the clutch control lever 2 in reverse position, the piston 22 will move both pistons against pressure in chamber 18 until the piston 22 engages the open end of the casing 4 in which position it is shown in the drawing. In this position of the piston 22, the extension 24 will hold the piston 9 against pressure of fluid in chamber 18 in a neutral position for correspondingly positioning the clutch control lever 2.

The control valve device 3 comprises a casing 31 adapted to be mounted on a suitable panel 32 or the like and containing a forward position valve unit 33, a neutral position valve unit 34 and a reverse position valve unit 35.

The three valve units 33, 34 and 35 are similar in construction each comprising a cylindrical body portion 36 formed with a plurality of successively reducing diameters and inserted into a bore in the casing to a position in which a shoulder 37 formed at the junction of a smaller diameter at one end and an intermediate diameter engages a suitable shoulder 38 formed at the junction of two bores of different diameter in the casing. The larger end of the body 36 is provided with a bore 39 in which is located a release valve 40 and a supply valve 41. A smaller bore 42 extends from the larger bore 39 through to the end of the smaller end of the body portion. In this bore 42 is located a supply valve stem 43 one end of which is connected to the supply valve. The supply valve stem extends beyond the valve body and is provided on its opposite end with a screw thread to receive a button 44 for manual operation of the valves as explained hereinafter.

A supply valve seat is formed on the body portion 36 around the end of bore 42 adjacent the bore 39 on which the supply valve is normally urged to seat and a number of small ports 45 extend from the bore 42 adjacent the supply valve seat to a port 46 in the casing 31, which port is normally connected by a pipe 47 to a fluid pressure supply reservoir (not shown). The valve stem 43 is fluted adjacent the supply valve to allow flow of supply pressure past the supply valve 41 when the valve is unseated and said stem is further provided with a sealing ring 48 in a cylindrical portion of said stem in sealing contact with the wall of the bore 42 which prevents leakage of fluid under pressure from the valve side of said ring to the atmosphere between the valve stem 43 and the bore 42.

The release valve 40 comprises a cup-shaped member 49 slidably mounted in bore 39 and a rubber like composition valve seat 50 preferably vulcanized to the inside of the cup for cooperation with a valve seat to be hereinafter described. A spring 51 acting on the release valve 40 normally supports it in an unseated position and urges the contacting supply valve 41 against its seat.

The larger open end of the casing bore containing the valve body 36 is normally closed by a member 52 disposed in said bore with one side in contact with the adjacent and larger end of said body, while engaging the opposite side is a removable spring type snap ring 53 a portion of which fits into an annular groove in the casing open to said bore. The ring 53 retains the valve body 36 and the member 52 in the casing, but upon removal of said ring and of button 44, these parts may be removed from the casing. An extension 54 of member 52 projects into the bore 39 in the body 36 and on its end there is provided a valve seat for cooperation with the release valve 40. The spring 51 encircles the extension 54 and is supported by the member 52. An exhaust port 55 leads from the release valve seat to the lower side of the member 52 which in the casing of valve units 33 and 34 is exposed to atmosphere. In valve unit 35 this port 55 leads to a chamber 56 formed between the lower side of member 52 and a closing member 57 held in the casing by a removable snap ring 57a. The member 57 is provided with a number of lugs 58 which extend into contact with the member 52 of valve unit 35 to support said valve unit in the casing 31.

In each of the valve units a cavity 59 is formed in the casing 31 about the lower end of the body 36. This cavity 59 is connected to a chamber 60 formed above the exhaust valve 40 and containing the supply valve 41, by a number of ports 61 in the body. The cavity 59 is also connected to a chamber at the opposite side of the release valve 40 by a number of small ports 62.

The cavity 59 in valve unit 33 is connected by a port 63 to pipe 29 leading to chamber 28 in the power motor 1. In the valve unit 34 cavity 59 is connected by a port 64 to the cavity 56 in valve unit 35 and to pipe 27 leading to chamber 26 of the power motor 1. In valve unit 35 cavity 59 is connected by a port 65 to pipe 19 leading to chamber 18 of the power motor 1.

*Operation of apparatus*

Normally the buttons 44 of the three valve units 33, 34 and 35 are relieved of manual pressure which in each valve unit permits spring 51 to unseat the release valve 40 and to seat the supply valve 41. Chambers 28 and 18 in the motor 1 will therefore be normally open to atmosphere past the open release valves 40 in the valve units 33, 34, respectively, while chamber 18 in said motor will be open to atmosphere past the open release valve 40 in the valve unit 35 and thence through chamber 56, port 64 and past the open release valve 40 in the valve unit 34.

Now assuming that port 47 is connected to a suitable supply of fluid under pressure, that the power motor 1 is positioned as shown in the drawing and that it is desired to effect movement of the clutch control lever 2 to its forward position. The operator will apply sufficient pressure to the button 44 of valve unit 33 to cause the supply valve 41 to be unseated and to seat the release valve 40 therein against the opposing force of the respective spring 51. Fluid under pressure from the supply pipe 47 will then flow via port 46, and through the valve unit 33 via the respective ports 45, past the supply valve 41, and ports 61 to cavity 59, and thence through port 63 and pipe 29 to chamber 28 of the power motor. With chamber 18 open to atmosphere as above explained, the pressure of fluid thus provided in chamber 28 will move piston 9 toward chamber 18 until it engages the closed end of casing 4 thus moving the clutch control lever 2 to its forward position. Fluid under pressure supplied to chamber 28 as just described will also move piston 22 to its outer position in contact with stop 22a but without effect or importance in the operation under consideration. After the clutch control lever 2 obtains its forward position the operator can remove his hand from the button 44 of the valve unit 33, whereupon in said unit spring 51 will unseat the release valve 40 and seat the supply valve 41. The supply of fluid under pressure to chamber 28 will thereby be cut off and the fluid pressure in said chamber 28 will be released to the atmosphere past the unseated release valve 40 in valve unit 33 and through port 55, for thereby, in the case of a clutch or the like relieving the shifting bearings of actuating force.

To disengage the forward clutch by moving the lever 2 to neutral position, the operator will apply sufficient pressure to the button 44 of valve unit 34 to cause it to move downward for unseating the supply valve 41 and seating the release valve 40 therein. Fluid pressure is thereby admitted to port 64 and thence through pipe 27 to chamber 26 of the power unit 1 and also from port 64 to chamber 56 of valve unit 35 and thence through port 55 past the unseated exhaust valve 40 of unit 35 to port 65 therein which is open to chamber 18 of the power unit 1. Fluid under pressure thus supplied to chamber 26 will move piston 22 toward chamber 28 until it engages the open end of casing 4, while the fluid under pressure provided in chamber 18 will move piston 9 toward chamber 28 until it engages the extension 24 of piston 22 in which position it will stop due to the larger area of piston 22. The piston 9 as it thus moves will pull the clutch lever 2 to its neutral position. As soon as the clutch lever 2 obtains its neutral position the operator will remove pressure from button 44 of unit 34 to permit closing of the supply valve 41 and opening of the release valve 40 therein to permit release of fluid under pressure from piston chambers 18 and 26 in motor 1 for relieving the clutch control lever 2 of actuating force.

To move the clutch control lever 2 to reverse positions, the operator will press the button 44 of valve unit 35 to unseat the supply valve 41 and to seat the release valve 40 therein whereupon fluid under pressure will be supplied to port 65 and via pipe 19 to chamber 18 of the power motor 1. The seating of the release valve 40 in unit 35 disconnects port 65 from port 64 so that fluid under pressure will not be supplied to the latter port which permits motor chamber 26 to remain open to atmosphere through the unit 34. With the motor chambers 28 and 26 thus open to atmosphere the pressure of fluid provided in chamber 18 will move piston 9 toward chamber 28 carrying with it piston 22 until the piston 22 engages the closed end of casing 5 which limits the movement of piston 7 to a position in which the clutch lever 2 is in its reverse position. After the clutch lever 2 obtains its reverse position manual pressure is removed from the valve unit 35 to permit opening of the release valve 40 and closing of the supply valve 41 therein. The fluid pressure in chamber 18 will then flow past the release valve of unit 35 to chamber 56, then to port 64 and to the atmosphere past the unseated release valve of unit 34, for thereby relieving the clutch control lever 2 of actuating forces.

In order to return the clutch control lever 2 from reverse position to neutral position the button 44 of the valve unit 34 need only be depressed and then after the operation is completed said button may be released to relieve said lever of actuating force, as will be clear from previous description.

*Summary*

From the above description it will now be seen that I have provided a control apparatus embodying a fluid motor for positively, selectively positioning a multi-position device in accordance with selective manual operation of any one of a plurality of control valve units, corresponding in number to the positions of said device, and which units are automatically operative upon relief of manual force at the termination of a selected operation to release actuating fluid under pressure from the motor for relieving the device of operating force.

Having now described my invention, what I claim as new and desire to secure by Letters Patent, is:

A control valve device for supplying fluid under pressure to and for releasing fluid under pressure from two control pipes, comprising a casing, two individual valve units in said casing each comprising a supply valve for supplying fluid under pressure to a chamber in the unit, a release valve seat, a release valve arranged to cooperate with said seat for controlling communication between said chamber and a passage opening to said seat, a push button manually operative to open said supply valve and to close said release valve, and a spring operable upon relief of manual pressure on said push button for closing said supply valve and for opening said release valve, said passage in one of said valve units opening to atmosphere, the other valve unit further comprising means cooperative with said casing to form a chamber open to the respective passage, means opening the last named chamber to the first named chamber in said one valve unit and to one of said pipes, and means opening the first named chamber in said other valve unit to the other pipe.

ROY R. STEVENS.

REFERENCES CITED

The following references are of record in the file of this patent:

UNITED STATES PATENTS

| Number | Name | Date |
|---|---|---|
| 1,595,458 | Doolittle | Aug. 10, 1926 |
| 2,165,988 | Stewart | July 11, 1939 |
| 2,184,413 | Chiesa | Dec. 26, 1939 |